(12) United States Patent
Adimatyam et al.

(10) Patent No.: US 10,341,717 B2
(45) Date of Patent: Jul. 2, 2019

(54) SYSTEMS AND METHODS FOR FACILITATING ACCESS TO CONTENT ASSOCIATED WITH A MEDIA CONTENT SESSION BASED ON A LOCATION OF A USER

(71) Applicant: Verizon Patent and Licensing Inc., Arlington, VA (US)

(72) Inventors: Venkata S. Adimatyam, Irving, TX (US); Sameer Gavade, Irving, TX (US); Tariq Roshan, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 457 days.

(21) Appl. No.: 14/231,134

(22) Filed: Mar. 31, 2014

(65) Prior Publication Data

US 2015/0281767 A1    Oct. 1, 2015

(51) Int. Cl.
| | | |
|---|---|---|
| *G06F 3/048* | (2013.01) | |
| *H04N 21/436* | (2011.01) | |
| *H04N 21/441* | (2011.01) | |
| *H04N 21/45* | (2011.01) | |
| *H04N 21/4363* | (2011.01) | |
| *H04N 21/442* | (2011.01) | |

(52) U.S. Cl.
CPC . *H04N 21/43615* (2013.01); *H04N 21/43637* (2013.01); *H04N 21/441* (2013.01); *H04N 21/44218* (2013.01); *H04N 21/4532* (2013.01)

(58) Field of Classification Search
CPC ..... H04L 67/141; H04L 12/282; H04L 67/22; G06F 9/542; G06F 3/013; G06F 21/31; G08C 2201/91; H04W 92/20
See application file for complete search history.

(56) References Cited

U.S. PATENT DOCUMENTS

| | | | | |
|---|---|---|---|---|
| 8,588,824 B2 * | 11/2013 | Rowe | ................. | H04N 21/4126 386/231 |
| 8,989,053 B1 * | 3/2015 | Skaaksrud | ............ | H04W 12/06 370/255 |
| 8,995,240 B1 * | 3/2015 | Erven | ....................... | H04B 1/20 369/30.27 |
| 9,094,706 B2 * | 7/2015 | Reily | ................. | H04N 21/4126 |
| 9,137,640 B2 * | 9/2015 | Eaton | .................... | H04W 4/043 |

(Continued)

*Primary Examiner* — Andrey Belousov
*Assistant Examiner* — Haimei Jiang

(57) ABSTRACT

An exemplary method includes a content delivery system determining that a user profile of a user is logged in to a first access device during a media content session associated with the first access device in which the first access device presents media content to the user, detecting that the user moves outside a vicinity of the first access device while the user profile is logged in to the first access device during the media content session, identifying, in response to the user moving outside the vicinity of the first access device, a second access device associated with the user and that is within a vicinity of the user, and automatically providing, in response to the identifying, session management content corresponding to the media content session associated with the first access device for presentation by the second access device while the user is outside the vicinity of the first access device. Corresponding systems and methods are also described.

19 Claims, 10 Drawing Sheets

(56) References Cited

U.S. PATENT DOCUMENTS

| | | | | |
|---|---|---|---|---|
| 9,201,627 | B2* | 12/2015 | Tam | G06F 3/1454 |
| 9,219,790 | B1* | 12/2015 | Filev | H04L 67/22 |
| 2004/0130567 | A1* | 7/2004 | Ekin | A63B 24/0003 |
| | | | | 715/723 |
| 2004/0223605 | A1* | 11/2004 | Donnelly | H04M 3/02 |
| | | | | 379/373.01 |
| 2004/0237107 | A1* | 11/2004 | Staples | H04L 29/06027 |
| | | | | 725/47 |
| 2005/0239479 | A1* | 10/2005 | Bednasz | H04M 1/72572 |
| | | | | 455/456.1 |
| 2007/0097975 | A1* | 5/2007 | Rakers | G06Q 30/0241 |
| | | | | 370/392 |
| 2007/0265911 | A1* | 11/2007 | Rondeau | G06Q 30/02 |
| | | | | 705/14.14 |
| 2009/0065578 | A1* | 3/2009 | Peterson | G05B 19/048 |
| | | | | 235/382 |
| 2011/0016492 | A1* | 1/2011 | Morita | H04N 5/44543 |
| | | | | 725/58 |
| 2011/0069940 | A1* | 3/2011 | Shimy | G11B 27/105 |
| | | | | 386/296 |
| 2012/0116670 | A1* | 5/2012 | Rosekrans | G01C 21/3469 |
| | | | | 701/426 |
| 2012/0303439 | A1* | 11/2012 | Flitcroft | G06Q 10/107 |
| | | | | 705/14.36 |
| 2013/0060691 | A1* | 3/2013 | Typrin | G06Q 40/02 |
| | | | | 705/44 |
| 2013/0060692 | A1* | 3/2013 | Typrin | G06Q 40/02 |
| | | | | 705/44 |
| 2013/0165164 | A1* | 6/2013 | Rowe | H04N 21/4126 |
| | | | | 455/466 |
| 2013/0260867 | A1* | 10/2013 | Bronstein Bendayan | A63F 13/10 |
| | | | | 463/24 |
| 2014/0040374 | A1* | 2/2014 | Olsen | H04L 67/306 |
| | | | | 709/204 |
| 2014/0122737 | A1* | 5/2014 | Silberstein | G06F 17/30017 |
| | | | | 709/231 |
| 2014/0141714 | A1* | 5/2014 | Ghosh | H04L 29/08 |
| | | | | 455/39 |
| 2014/0280266 | A1* | 9/2014 | Walter | G06F 17/30038 |
| | | | | 707/758 |
| 2015/0005010 | A1* | 1/2015 | Zhang | H04W 4/023 |
| | | | | 455/456.3 |
| 2015/0038218 | A1* | 2/2015 | Barclay | G07F 17/323 |
| | | | | 463/25 |
| 2015/0100991 | A1* | 4/2015 | Risberg | H04L 67/104 |
| | | | | 725/80 |
| 2015/0128194 | A1* | 5/2015 | Kuang | H04N 21/41407 |
| | | | | 725/81 |
| 2015/0140982 | A1* | 5/2015 | Postrel | H04W 4/12 |
| | | | | 455/418 |
| 2015/0215382 | A1* | 7/2015 | Arora | H04N 21/4126 |
| | | | | 382/118 |
| 2016/0247537 | A1* | 8/2016 | Ricciardi | G11B 27/036 |

* cited by examiner

US 10,341,717 B2

SYSTEMS AND METHODS FOR FACILITATING ACCESS TO CONTENT ASSOCIATED WITH A MEDIA CONTENT SESSION BASED ON A LOCATION OF A USER

BACKGROUND INFORMATION

The advent of set-top box devices and other media content access devices ("access devices") has provided users with access to a large number and variety of media content choices. For example, a user may choose to experience a variety of broadcast television programs, pay-per-view services, video-on-demand programming, Internet services, and audio programming via a set-top box device. Such access devices have also provided service providers (e.g., television service providers) with an ability to present media content and/or interfaces that are tailored to specific users. For example, a user may log in to an access device with a user profile associated with the user to experience media content and/or interfaces that are specifically tailored to the user. A different user may subsequently log in to the access device with a different user profile and be presented with different media content and/or interfaces.

A user may often desire or need to leave the vicinity of an access device while the access device is presenting media content to the user. For example, the user may have to leave a room in which the access device is located. Unfortunately, the user may miss media content being presented by the access device while the user is outside the room. Moreover, unless the user manually logs his or her user profile out of the access device before he or she leaves the room, the user profile will remain logged in to the access device while the user is outside the room. This may result in a second user still located in the room experiencing content specifically tailored to the first user by way of the access device instead of content specifically tailored to the second user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary systems and methods for facilitating access to content associated with a media content session based on a location of a user are disclosed herein. For example, a content delivery system may determine that a user profile of a user is logged in to a first access device during a media content session associated with the first access device in which the first access device presents media content to the user. While the user profile is logged in to the first access device during the media content session, the content delivery system may detect that the user moves outside a vicinity of the first access device. In response to the user moving outside the vicinity of the first access device, the content delivery system may identify a second access device associated with the user and that is within a vicinity of the user. In response to identifying the second access device, the content delivery system may automatically provide content (e.g., session management content) corresponding to the media content session associated with the first access device for presentation by the second access device while the user is outside the vicinity of the first access device.

The systems and methods described herein may allow a user to experience content associated with a media content session associated with an access device even when the user moves outside a vicinity of the access device. For example, a user may log his or her user profile in to a first access device in order to initiate a media content session in which the first access device presents media content to the user. The user may subsequently leave a vicinity of the first access device (e.g., by leaving a room in which the access device is located). The content delivery system described herein may detect that the user moves outside the vicinity of the first access device, and, in response, may identify a second access device associated with the user and that is within a vicinity of the user. For example, the content delivery system may determine that the user is carrying a mobile device while the user is outside the vicinity of the first access device. In response, the content delivery system may automatically provide content associated with the media content session for presentation by the second access device while the user is outside the vicinity of the first access device. As will be described below, this content may include session management content corresponding to the media content session associated with the first access device (e.g., a notification associated with the media content session, one or more selectable options associated with the media content session, and/or a recommendation associated with the media content session) and/or any other content associated with the media content session (e.g., media content being presented by the first access device during the media content session) as may serve a particular implementation.

Figure 1:
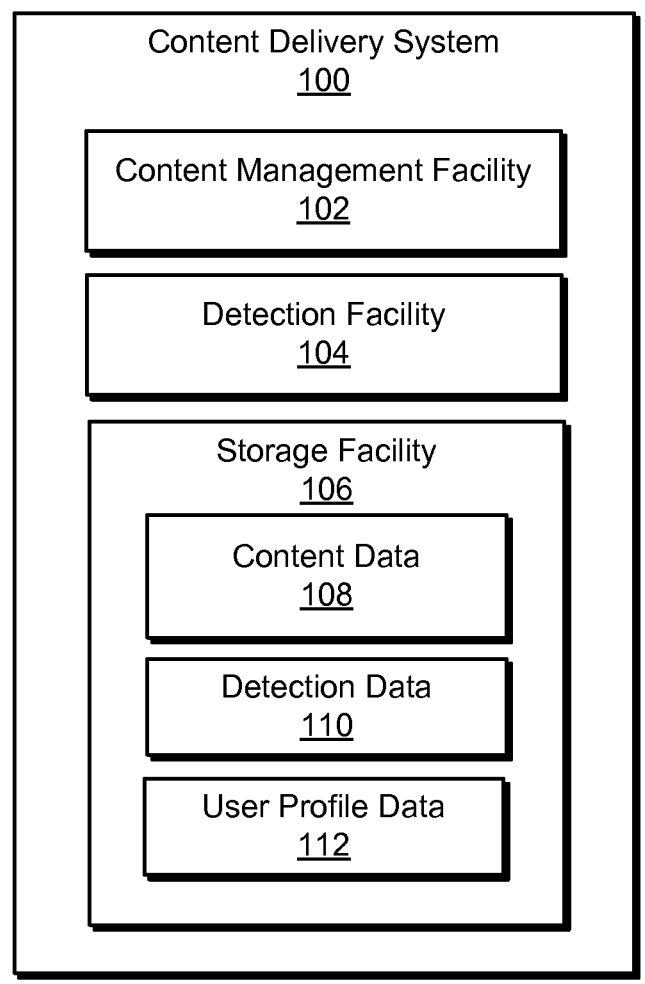
FIG. 1 illustrates an exemplary content delivery system according to principles described herein.

FIG. 1 illustrates an exemplary content delivery system 100 (or simply "system 100"). As shown, system 100 may include, without limitation, a content management facility 102 (or simply "management facility 102"), a detection facility 104, and a storage facility 106 selectively and communicatively coupled one to another. Facilities 102-106 may be coupled to one another by any suitable communication technologies.

It will be recognized that although facilities 102-106 are shown to be separate facilities in FIG. 1, any of those facilities may be combined into a single facility or split into additional facilities as may serve a particular implementation. Additionally or alternatively, one or more of the facilities 102-106 may be omitted from and external to system 100 in other implementations. Facilities 102-106 will now be described in more detail.

Storage facility 106 may be configured to store content data 108 representative of content associated with a media content session, detection data 110 generated and/or used by detection facility 104, and user profile data 112 representative of one or more user profiles of one or more users of the various access devices described herein. Storage facility 106 may maintain additional or alternative data as may serve a particular implementation.

Management facility 102 may perform various content management operations. For example, management facility 102 may determine that a user profile of a user is logged in to a first access device during a media content session in which the first access device presents media content to the user. As used herein, the term "media content" may refer to a television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, and/or any other media instance that may be presented by an access device.

As used herein, a "media content session" associated with an access device may refer to any time period during which a user profile of a user is logged in to the access device such that the access device presents content (e.g., media content, user interfaces, recommendations, etc.) in accordance with the user profile (e.g., in a manner that is personalized for the user). The media content session may also refer to a time period of any suitable duration that immediately follows a logging out of the user profile of the user from the access device. For example, as will be described below, management facility 102 may automatically log a user profile of a user out of an access device in response to or after the user leaves a vicinity of the access device (e.g., in order to log a different user profile of a different user in to the access device). However, the media content session that was initiated by the user may continue for any suitable amount of time (e.g., for a predetermined amount of time, until the access device finishes presenting a particular media content program, until the user manually ends the media content session, etc.).

Management facility 102 may determine that the user profile is logged in to the first access device in any suitable manner. For example, management facility 102 may access user profile data 112 maintained by storage facility 106 to determine which user profile is currently logged in to the first access device. A user profile may be logged in to an access device in any suitable manner. For example, a user profile may be manually logged in to the access device (e.g., by a user entering a username and/or password). Additionally or alternatively, a user profile may be automatically logged in to the access device (e.g., by the access device detecting that a user is within a vicinity of the access device, by the access device recognizing usage patterns of the user with respect to the access device, etc.).

Detection facility 104 may detect that the user moves outside a vicinity of the first access device while the user profile is logged in to the first access device during the media content session. The user may move outside the vicinity of the first access device for any suitable reason. For example, the user may have to run an errand, may have to use the restroom, and/or may simply want to take a break from the media content session. Leaving a vicinity associated with the access device may undesirably result in the user not being aware of and/or not receiving content associated with the media content session.

Detection facility 104 may detect that the user moves outside the vicinity of the first access device in any suitable manner. For example, detection facility 104 may detect that a wireless tracking device carried by the user moves outside a wireless range of the first access device. The wireless tracking device may be implemented in any suitable manner. Specific examples of how the wireless tracking device may be implemented are provided herein.

Figure 2:
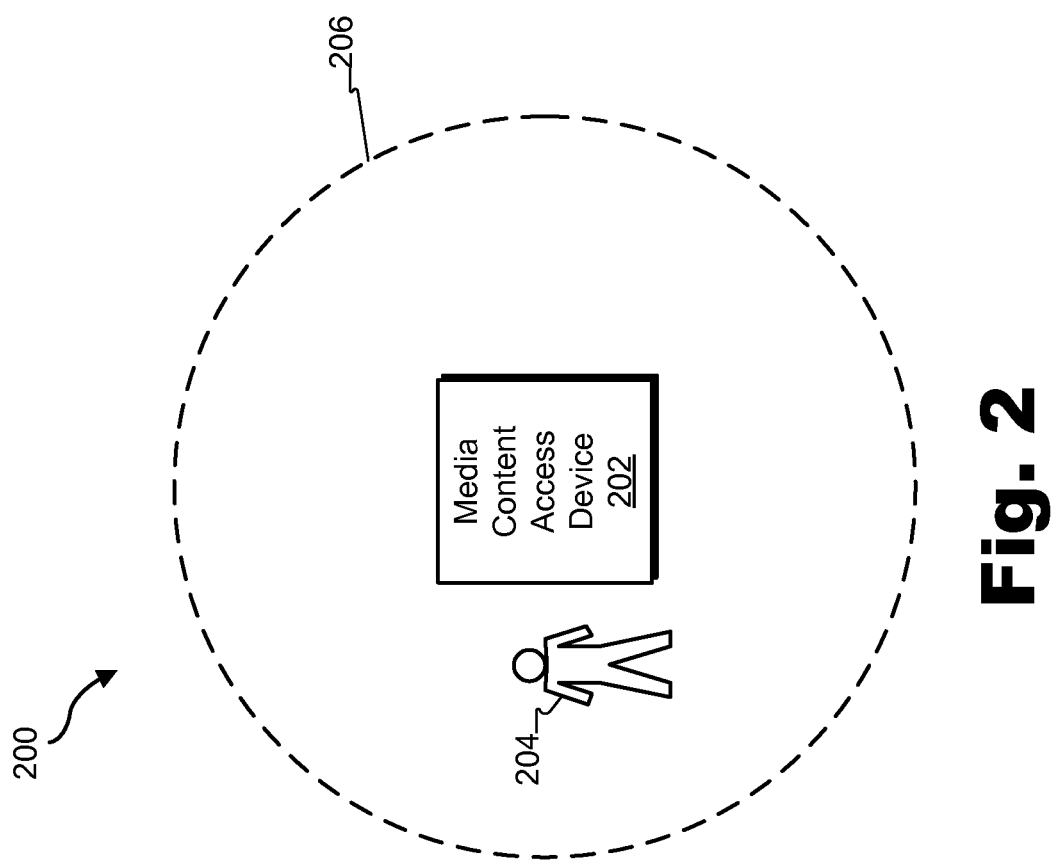
FIGS. 2-3 illustrate exemplary implementations showing vicinities of access devices with respect to a user according to principles described herein.

To illustrate, FIG. 2 shows an exemplary implementation 200 in which a relative physical position of a media content access device 202 ("access device 202") is shown in relation to a user 204. Access device 202 may be implemented by any device through which a user may interact to receive content associated with the media content session. For example, access device 202 may be implemented by a media player computing device (e.g., a media disc player device such as a digital video disc ("DVD") or BLUERAY DISC ("BD") player device), a display device, a set-top box device, a digital video recording ("DVR") device, a computer, a mobile device (e.g., a tablet computer or a smart phone device), and/or any other computing device as may serve a particular implementation.

As shown in FIG. 2, user 204 is located within a vicinity 206 of access device 202. Vicinity 206 may include any suitable area and may be defined in any suitable manner. For example, as shown in FIG. 2, vicinity 206 may include an area defined by a circle having a radius that is a predetermined distance from a center of access device 202. Alternatively, vicinity 206 may include a wireless range of access device 202 (e.g., a Bluetooth communication range and/or a near field communication ("NFC") range). That is, vicinity 206 may be defined by a maximum range at which a wireless tracking device (described in more detail below) may be located from access device 202 and still wirelessly communicate with access device 202. Vicinity 206 may be defined in any other manner as may serve a particular implementation.

As shown in FIG. 2, user 204 is initially located inside the boundaries of vicinity 206. User 204 may then walk or otherwise move outside of vicinity 206. When user 204 moves outside vicinity 206 of access device 202, user 204 may not be able to experience content associated with the media content session by way access device 202. For example, user 204 may not be able to see and/or hear media content that is being presented by way of access device 202.

Detection facility 104 may detect that user 204 moves outside of vicinity 206 in any suitable manner. For example, in implementations where vicinity 206 includes a wireless range of access device 202, detection facility 104 may determine that user 204 moves outside vicinity 206 by detecting a failure of a wireless tracking device carried by user 204 to communicate with access device 202 (e.g., by detecting a lack of a signal from the wireless tracking device) and/or by detecting a signal provided by the wireless tracking device that indicates that the wireless tracking device can no longer communicate with access device 202.

The wireless tracking device carried by user 204 may include any suitable device configured to wirelessly communicate with access device 202 (e.g., by way of Bluetooth or NFC) and be implemented in any suitable manner. For example, the wireless tracking device may be incorporated into any item that may be carried or worn by user 204, such as a watch, an armband, a piece of clothing, a piece of jewelry, a pin, etc. Alternatively, the wireless tracking device may be incorporated into or implemented by a mobile electronic device (e.g., a mobile phone, a tablet computer, a laptop computer, etc.) associated with user 204. In certain examples, the wireless tracking device may send a notification that is detected by detection facility 104 when user 204 moves outside vicinity 206.

In implementations where vicinity 206 includes a geographic area associated with (e.g., surrounding or in front of) access device 202, detection facility 104 may detect that user 204 moves outside of vicinity 206 by detecting that user 204 has moved to a geographic location that is outside of the geographic area associated with vicinity 206. The geographic location of user 204 may be detected in any suitable way. For example, the geographic location of user 204 may be detected using Global Positioning System ("GPS") technologies and/or terrestrial signaling triangulation technologies. To illustrate, user 204 may walk or otherwise move outside of vicinity 206 while carrying a mobile device (e.g., a mobile phone). Detection facility 104 may access, in any suitable manner, GPS information from the mobile device to determine the geographic location of user 204 and whether user 204 is outside of vicinity 206.

Additionally or alternatively, detection facility 104 may utilize one or more sensors (e.g., cameras) to detect whether user 204 is within vicinity 206. The one or more sensors may be implemented in any suitable manner. For example, detection facility 104 may utilize one or more cameras to detect whether user 204 is within a room in which access device 202 is located.

In response to the user moving outside the vicinity of the first access device, management facility 102 may identify a second access device associated with the user and that is within a vicinity of the user. The second access device may be associated with the user in any suitable manner. In certain examples, the second access device may be associated with the user by being located at a user premises associated with the user (e.g., in a room). Additionally or alternatively, the second access device may be associated with the user by being owned by and/or registered with the user. For example, management facility 102 may determine that an access device is associated with the user by determining that a user profile of the user has been or is currently logged in to the access device, that the access device is registered with the user, and/or that the user has previously interacted with the access device in any suitable manner.

Figure 3:
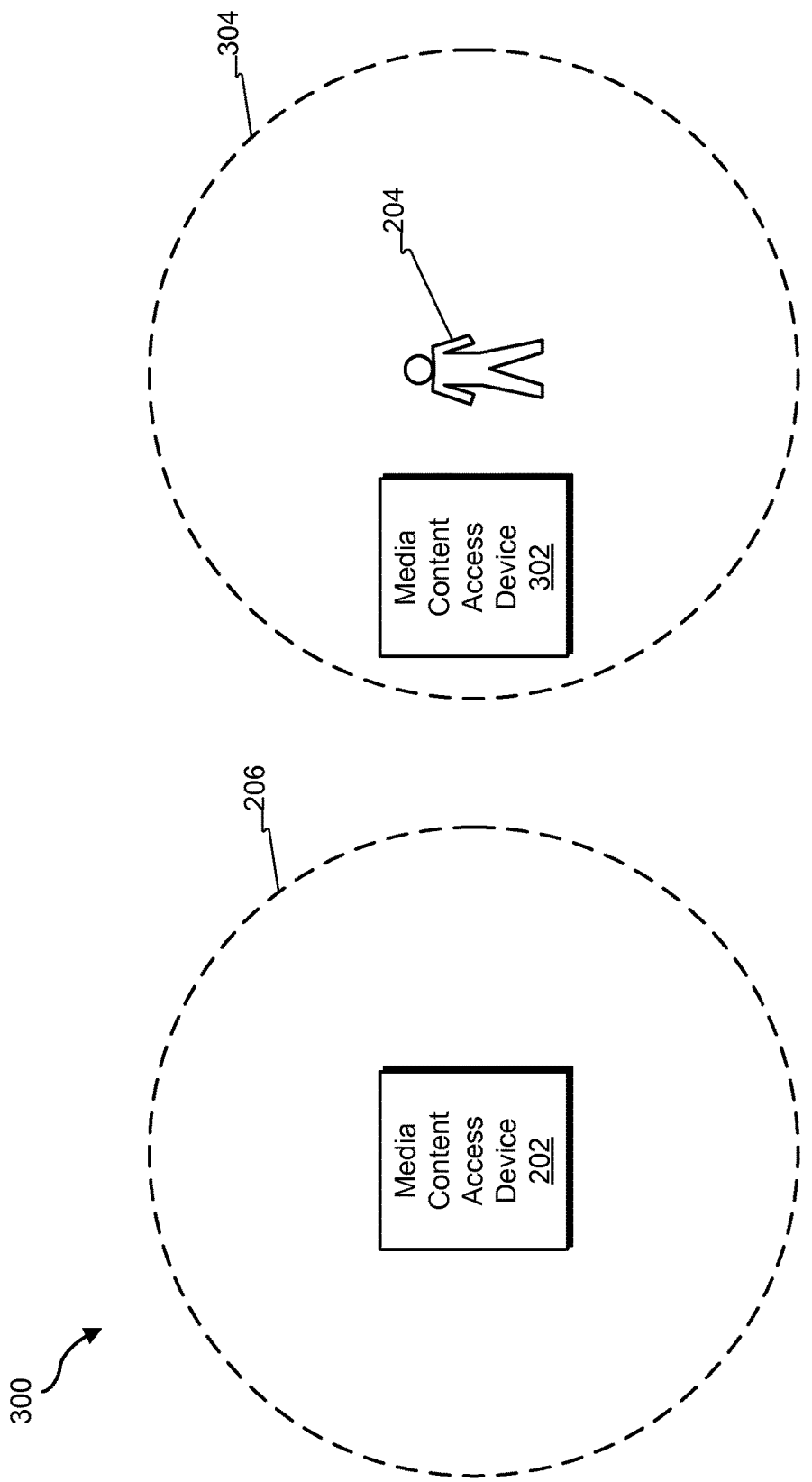

The identification of whether the second access device is within the vicinity of the user may be performed in any suitable manner. As used herein, a second access device that is within the "vicinity of the user" may refer to the second access device being located at any location and/or area associated with the user that may facilitate the user's interaction with the second access device while the user is outside the vicinity of the first access device. To illustrate, FIG. 3 shows an exemplary implementation 300 in which user 204 has moved outside vicinity 206. As shown, a second access device 302 is now within a vicinity 304 of user 204. Access device 302 may be implemented by any of the computing devices described herein.

In certain examples, management facility 102 may determine that access device 302 is within vicinity 304 of user 204 in any suitable manner, such as by determining that user 204 is within a vicinity of access device 302. For example, user 204 may be carrying a wireless tracking device (such as the wireless tracking device described above). In this scenario, management facility 102 may determine that access device 302 is within vicinity 304 of user 204 by determining that the wireless tracking device is within a wireless range of access device 302. Additionally or alternatively, management facility 102 may determine that access device 302 is within vicinity 304 of user 204 by determining that user 204 is located within a geographic area associated with access device 302 (e.g., by determining that user 204 is within a predetermined distance of access device 302). This may be performed in any of the ways described herein.

Additionally or alternatively, management facility 102 may determine that access device 302 is within vicinity 304 of user 204 based on an interaction of user 204 with access device 302. For example, while user 204 is outside vicinity 206, user 204 may interact with access device 302 by, for example, turning on, unlocking, or making any other suitable user input associated with access device 302. Such an interaction may indicate to management facility 102 that access device 302 is within vicinity 304 of user 204.

In response to identifying that the second access device associated with the user is within the vicinity of the user while the user is outside the vicinity of the first access device, management facility 102 may automatically provide content corresponding to the media content session associated with the first access device for presentation by the second access device while the user is outside the vicinity of the first access device.

For example, management facility 102 may automatically provide session management content corresponding to the media content session associated with the first access device for presentation by the second access device while the user is outside the vicinity of the first access device. As used herein, "session management content" refers to any content configured to facilitate management by the user of the media content session associated with the first access device. For example, the session management content may include a notification associated with the media content session, one or more selectable options associated with the media content session, a recommendation associated with the media content session, and/or any other session management content corresponding to the media content session associated with the first access device as may serve a particular implementation. Examples of these types of session management content that may be provided for presentation by the second access device while the user is outside the vicinity of the first access device will now be provided.

This content may include a media content program being presented by the first access device while the user is outside the vicinity of the first access device, Examples of these types of content that may be provided for presentation by the second access device while the user is outside the vicinity of the first access device will now be provided.

In some examples, the session management content provided by management facility 102 for presentation by the second access device while the user is outside the vicinity of the first access device may include a notification associated with the media content session. To illustrate, one or more users of access device 202 may have scheduled access device 202 to record three media programs at the same time, which may not be supported by access device 202. Accordingly, while user 204 is outside vicinity 206, management facility 102 may provide a notification by way of access device 302 regarding the scheduling conflict. In certain implementations, user 204 may be able to resolve the scheduling conflict by way of access device 302 instead of having to return to within vicinity 206 associated with access device 202 to resolve the scheduling conflict by way of access device 202. For example, user 204 may be able to cancel one of the scheduled recordings through a user input provided by way of access device 302.

The notification associated with the media content session may be provided to access device 302 in any suitable manner. For example, the notification may be provided by way of a text message, an email, a sound, a notification within an application being executed by access device 302, a pop-up window, etc. In certain examples, the notification may be user selectable to facilitate user 204, for example, performing an action with respect to the media content session (e.g., resolving a scheduling conflict associated with the media content session).

Additionally or alternatively, the session management content provided by management facility 102 for presentation by the second access device while the user is outside the vicinity of the first access device may include one or more selectable options associated with the media content session. Such selectable options may include, but are not limited to, playback options, rating options, and/or options associated with sharing media content with other users. The one or more selectable options may be provided in any suitable manner. For example, while user 204 is outside vicinity 206, management facility 102 may provide selectable options to user 204 by way of access device 302 that facilitate non-linear playback of a media content program being presented during the media content session, rating of a media program being presented during the media content session, and/or sharing the media program being presented during the media content session (e.g., by way of one or more social media venues).

Additionally or alternatively, the session management content provided by management facility 102 for presentation by the second access device while the user is outside the vicinity of the first access device may include a recommendation associated with the media content session. The recommendation may be provided in any suitable manner. For example, while user 204 is outside vicinity 206, management facility 102 may provide a recommendation for user 204 by way of access device 302 to watch a particular movie that may be of interest to user 204. In certain examples, the recommended movie may also be related to a media content program being presented by access device 202 during the media content session. The recommendation may be based on information included in, for example, user profile data 112 and/or any other suitable information associated with user 204.

In certain examples, the content provided by management facility 102 for presentation by the second access device while the user is outside the vicinity of the first access device may additionally or alternatively include a media content program being presented by the first access device during the media content session while the user is outside the vicinity of the first access device. For example, access device 202 may be presenting a movie when user 204 moves outside the vicinity 206 of access device 202. Detection facility 104 may detect this movement, and in response, management facility 102 may identify access device 302 (e.g., a mobile device carried by user 204 or a set-top box device located within another room of the user's home) that is within a vicinity of user 204 while user 204 is outside vicinity 206 of access device 202. In response to the identification, management facility 102 may automatically begin providing the movie for presentation by access device 302 while the user 204 is outside the vicinity 206 of access device 202.

In some examples, the movie may be provided by management facility 102 in a manner such that presentation of the movie by access device 302 is temporally synchronized with the presentation of the movie by access device 202.

Alternatively, the movie may be provided in a manner such that presentation of the movie by access device 302 begins at a temporal position corresponding to a time at which the user leaves vicinity 206 of access device 202. In this manner, user 204 may not miss any portion of the movie that may be presented by access device 202 during a time period that begins when the user 204 leaves vicinity 206 of access device 202 and ends when the user 204 is ready to begin accessing content by way of access device 302. For example, management facility 102 may provide data representative of the movie to access device 302 beginning at a temporal position within the movie that corresponds to the time at which the user leaves vicinity 206 of access device 202. However, access device 302 may not begin presenting the movie until user 204 indicates (e.g., by selecting a "play" option) that he or she is ready to begin watching the movie by way of access device 302.

In some examples, the content provided by management facility 102 for presentation by the second access device while the user is outside the vicinity of the first access device may be provided in response to an event that occurs with respect to media content being presented by the first access device during the media content session. The event may include any type of event as may serve a particular implementation. For example, the event may include an event (e.g., a scoring event) that occurs during a sporting event being presented by the first access device.

Management facility 102 may detect an event that occurs with respect to a media content program being presented by the first access device during the media content session in any suitable manner. For example, management facility 102 may detect the event by accessing and analyzing content data 108 (e.g., metadata, closed captioning data, Internet-based data, and/or any other data) associated with the media content program (e.g., during a broadcast of the media content program). As another example, management facility 102 may detect the event by receiving data (e.g., from a system separate from system 100) representative of the event while the media content program is being presented.

Based on the detected event, management facility 102 may provide a notification of the event to the user by way of the second access device while the user is outside the vicinity of the first access device. The notification may include one or more options associated with the media content program. For example, the notification may include an option for the user to experience the media content program by way of the second access device while the user is outside the vicinity of the first access device.

To illustrate, user 204 may be watching a sporting event being presented by access device 202. During the sporting event, user 204 may move outside vicinity 206 of access device 202. While user 204 is outside vicinity 206, management facility 102 may determine that, for example, a score occurs during the sporting event while the sporting event is being presented during the media content session at access device 202. In response, management facility 102 may provide, for example, a notification of the score to user 204 by way of access device 302.

Figure 4:
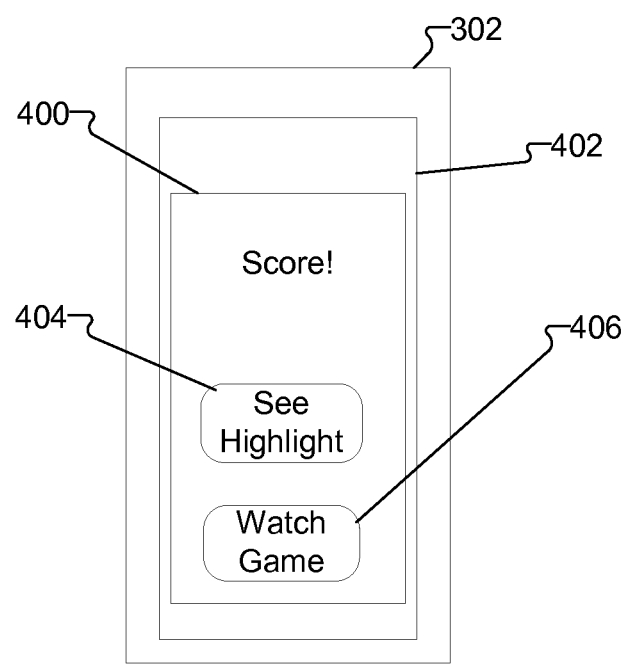
FIG. 4 illustrates an exemplary notification that may be provided to an access device according to principles described herein.

FIG. 4 shows an exemplary notification 400 of the score that may be provided for presentation by access device 302. As shown in FIG. 4, notification 400 may be provided for display on a display screen 402 of access device 302. Notification 400 may be presented by access device 302 in the manner illustrated in FIG. 4 or in any other suitable manner. In addition to indicating that a score occurred, the notification 400 may also include any other information associated with the score. Such other information may include information regarding who made the score (e.g., the team, the player, etc.), the total score, the time remaining in the game when the score occurred, etc.

In certain examples, a user may want to experience the media content by way of the second access device as a result of receiving a notification that the event occurred during the media content session at the first access device. Accordingly, management facility 102 may provide, based on the detected event, an option for the user to experience the media content by way of the second access device while the user is outside the vicinity of the first access device. In certain examples, management facility 102 may detect a selection by the user of the option and, in response, direct the second access device to begin presenting the media content.

To illustrate, in the example illustrated in FIG. 4, notification 400 includes a first selectable option 404 identified as "See Highlight" and a second selectable option 406 identified as "Watch Game." In response to a user selection of option 404, management facility 102 may direct access device 302 to present a highlight (e.g., a video highlight) of the score. In response to a user selection of option 406, management facility 102 may direct access device 302 to begin presenting the sporting event.

In each of these examples, it may be desirable to prevent the content (e.g., the session management content) that is provided for presentation by the second access device 302 from being presented by the first access device 202. For example, with respect to the conflict resolution example, it may be desirable to prevent the conflict resolution notification from being presented by the first access device 202 so that it is only presented by the second access device 302. In this manner, another user still within the vicinity 206 of the first access device 202 may not have his or her media content consumption experience interrupted by the conflict resolution notification. To this end, management facility 102 may prevent at least some types of content associated with the media content session from being presented by the first access device 202 while the user 204 is outside the vicinity 206 of the first access device 202.

In certain examples, it may be desirable to automatically log a user profile of a user in to or out of an access device so that the user profile does not have to be manually changed through a user interface. To illustrate, in response to user 204 moving outside the vicinity of access device 202, management facility 102 may automatically log the user profile of user 204 in to access device 302. In this manner, management facility 102 may provide content associated with a media content session associated with access device 202 for presentation by access device 302 without user 204 having to manually log in to access device 302 and/or manually initiate an application on access device 302.

Additionally or alternatively, in response to user 204 moving outside the vicinity of access device 202, management facility 102 may log the user profile of user 204 out of access device 202. In some examples, detection facility 104 may detect that a second user is within the vicinity 206 of access device 202 subsequent to user 204 moving outside the vicinity 206 of access device 202. In response, management facility 102 may automatically log a user profile of the second user in to access device 202 after the user profile of user 204 is logged out of access device 202. In this manner, the second user may experience content by way of access device 202 that is personalized for the second user instead of content personalized for user 204.

In certain implementations, the first access device may include a set-top box device located in a first room at a user premises, and the second access device may be located in a second room at the user premises. To illustrate, FIGS. 5 and 6 each show an exemplary user premises 500 having rooms 502 (e.g., 502-1 and 502-2). Either one or both of access device 202 and access device 302 may be implemented by a set-top box device or any other type of access device. The features illustrated in FIGS. 5 and 6 may operate in a similar manner to those described above with respect to FIGS. 2 and 3. User premises 500 may correspond to any location where an access device may be located. For example, user premises 500 may correspond to a residence, a business, a government facility, or any other structure that may be associated with user 204.

Figure 5:
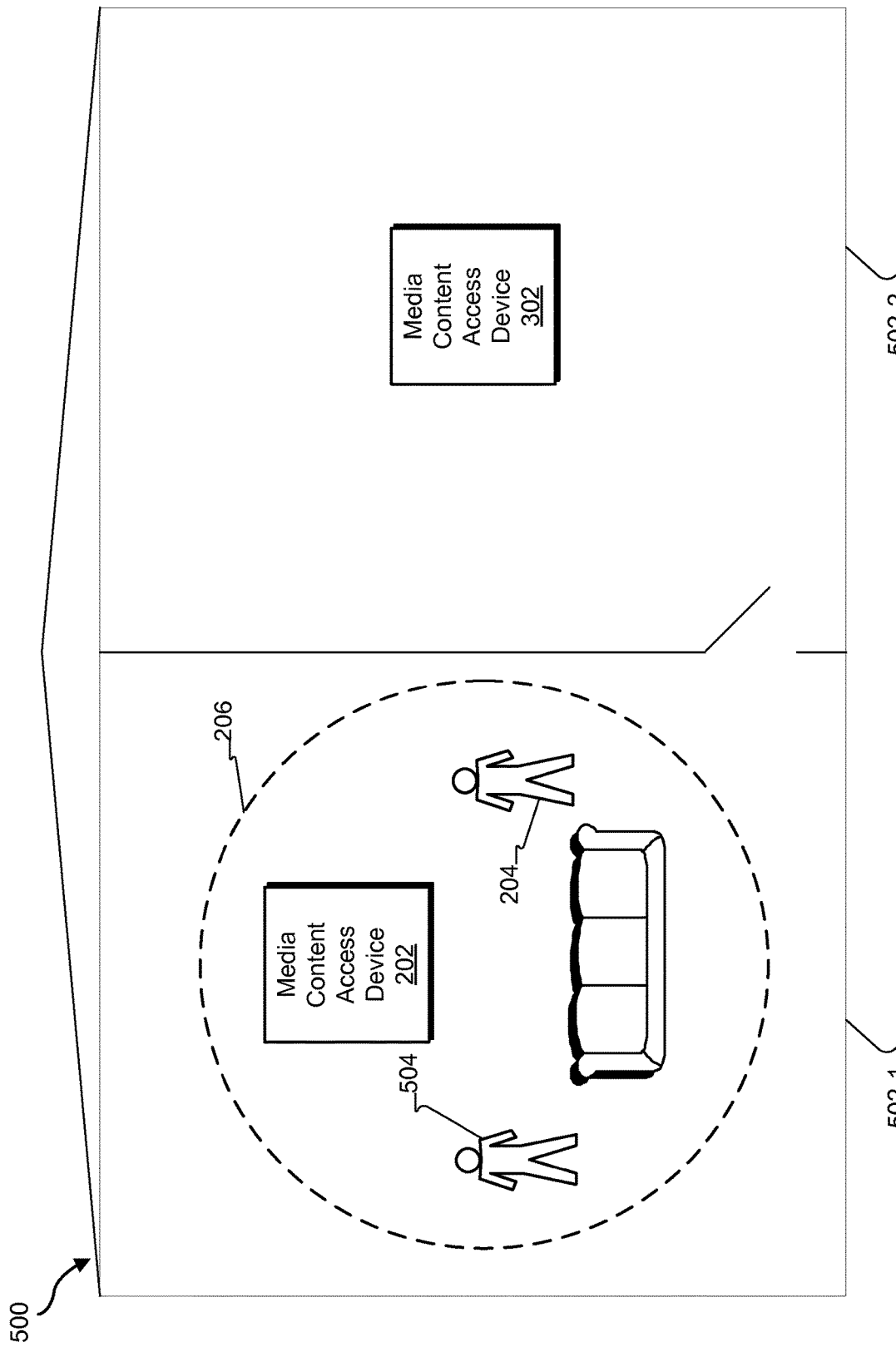
FIGS. 5-6 illustrate exemplary implementations showing vicinities of access devices with respect to a user according to principles described herein.
Figure 6:
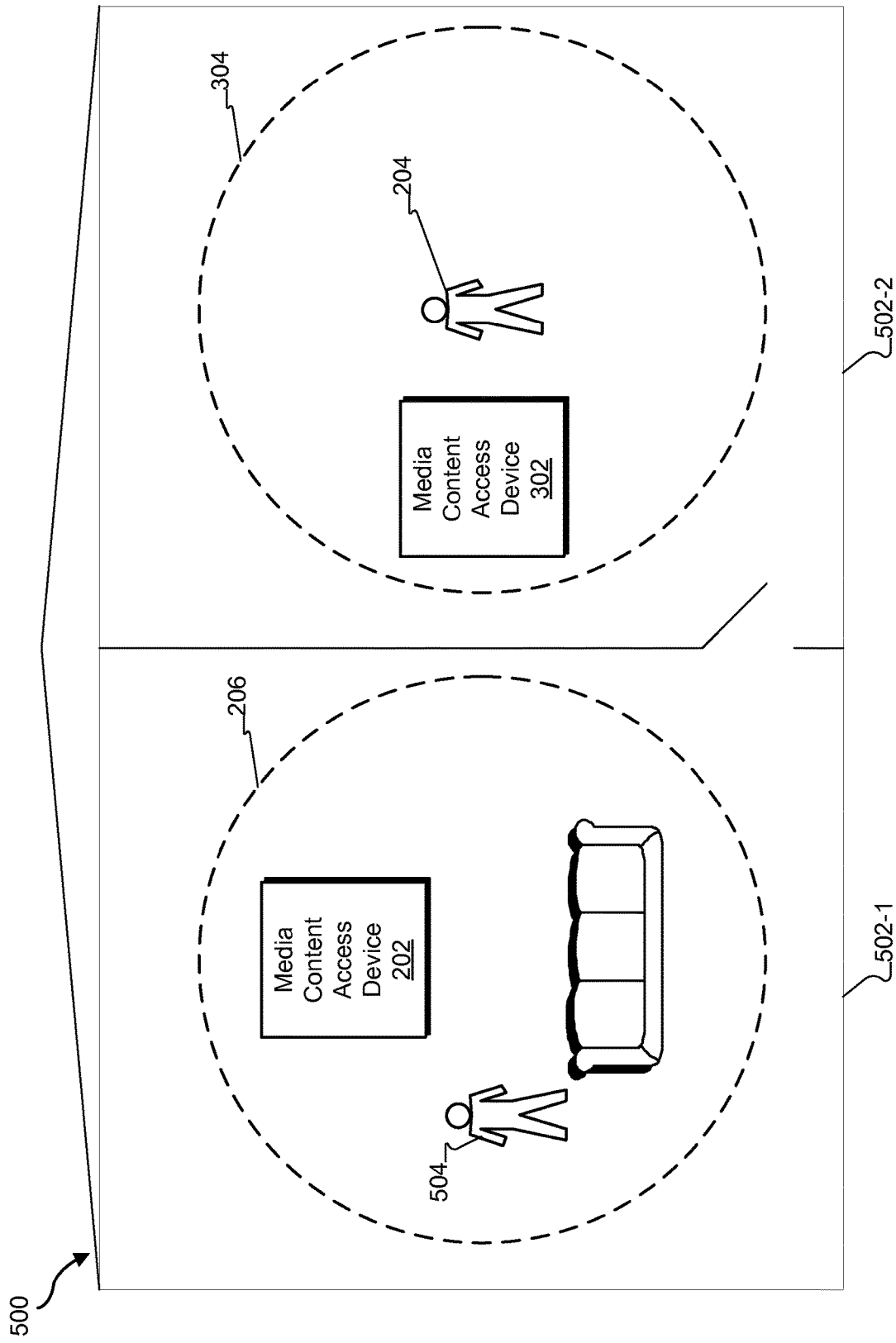

In certain implementations, two or more users may be within a vicinity of an access device at the same time. Accordingly, management facility 102 may be configured to dynamically manage which user profile of the two or more users is logged in to the access device at a given time. To illustrate, FIG. 5 shows a scenario in which a user 504 is within vicinity 206 at the same time as user 204. While both user 504 and user 204 are within vicinity 206, a user profile of user 204 may be logged in to access device 202 during a media content session. At some point during the media content session, user 204 may move out of room 502-1 and into room 502-2, as shown in FIG. 6. As a result of user 204 moving into room 502-2, management facility 102 may perform one or more management operations associated with the user profiles and access device 202. For example, management facility 102 may automatically log the user profile of user 204 out of access device 202 while user 204 is in room 502-2. After logging the user profile of user 204 out of access device 202, management facility 102 may automatically log a user profile of user 504 in to access device 202. In this manner or a similar manner, management facility 102 may be configured to dynamically switch which user profile is logged in to access device 202 to prevent providing content to user 504 by way of access device 202 that may be specifically tailored to user 204.

While user 204 is in room 502-2, management facility 102 may automatically provide content associated with the media content session (e.g., media programs, notifications, etc.) to access device 302. For example, if access device 202 is presenting a television program in room 502-1 during the media content session when user 204 leaves room 502-1, management facility 102 may cause the television program to be automatically presented by way of access device 302 while user 204 is in room 502-2.

Figure 7:
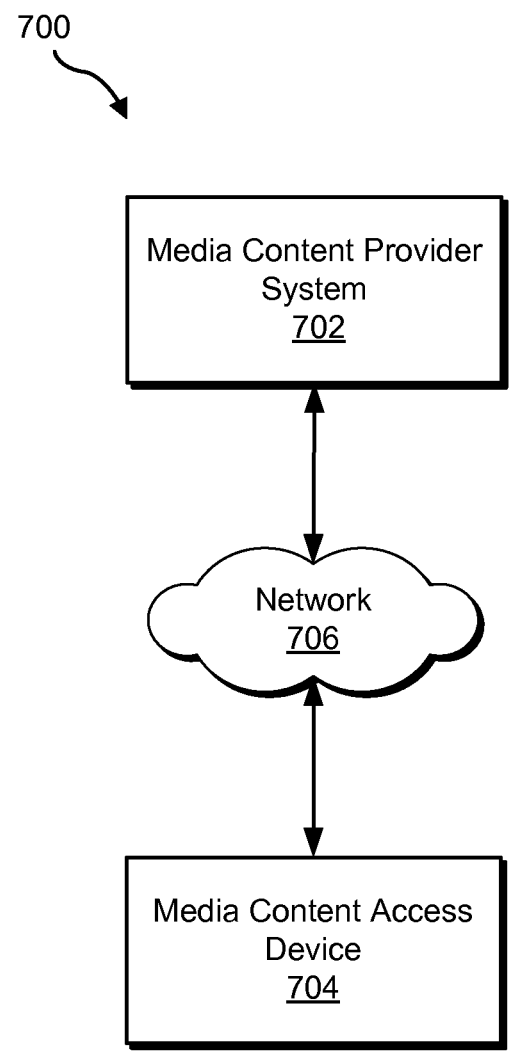
FIG. 7 illustrates an exemplary implementation of the system of FIG. 1 according to principles described herein.

FIG. 7 illustrates an exemplary implementation 700 of system 100 wherein a media content provider system 702 is communicatively coupled to an access device 704 by way of a network 706. Management facility 102, detection facility 104, and storage facility 106 may each be implemented by media content provider system 702 and/or access device 704. Accordingly, in certain embodiments, components of system 100 may be implemented entirely by media content provider system 702 or by access device 704. In other embodiments, components of system 100 may be distributed across media content provider system 702 and access device 704.

Media content provider system 702 may be associated with a service provider (e.g., a subscriber television service provider, an Internet service provider, etc.), a media content program provider (e.g., ESPN, NBC, etc.), and/or any other type of media content provider. Accordingly, media content provider system 702 may be configured to provide one or more media content services (e.g., television services, video-on-demand services, Internet services, application services, etc.) to access device 704. For example, media content provider system 702 may be configured to manage (e.g., maintain, process, distribute, and/or generate) media content (e.g., media content programs, advertisements, etc.) configured to be delivered to access device 704. Media content provider system 702 may be implemented by one or more computing devices as may serve a particular implementation.

Additionally or alternatively, media content provider system 702 may be implemented by one or more third party servers configured to manage recommended media content, interface with one or more social media service provider subsystems, and/or perform any other operation associated with the methods and systems described herein.

Access device 704 may facilitate access by a user to content (e.g., media content) provided by media content provider system 702. For example, access device 704 may be configured to perform one or more access events at the direction of a user. To illustrate, access device 704 may present and/or record a media program at the direction of a user.

Access device 704 may include one or more user computing devices associated with a user. Examples of such devices include, without limitation, any of the computing devices described herein.

Media content provider system 702 and access device 704 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, media content provider system 702 and access device 704 may communicate via a network 706. Network 706 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between media content provider system 702 and access device 704. Communications between media content provider system 702 and access device 704 may be transported using any one of the above-listed networks, or any combination or sub-combination of the above-listed networks. Alternatively, media content provider system 702 and access device 704 may communicate in another way such as by direct connections between media content provider system 702 and access device 704.

Figure 8:
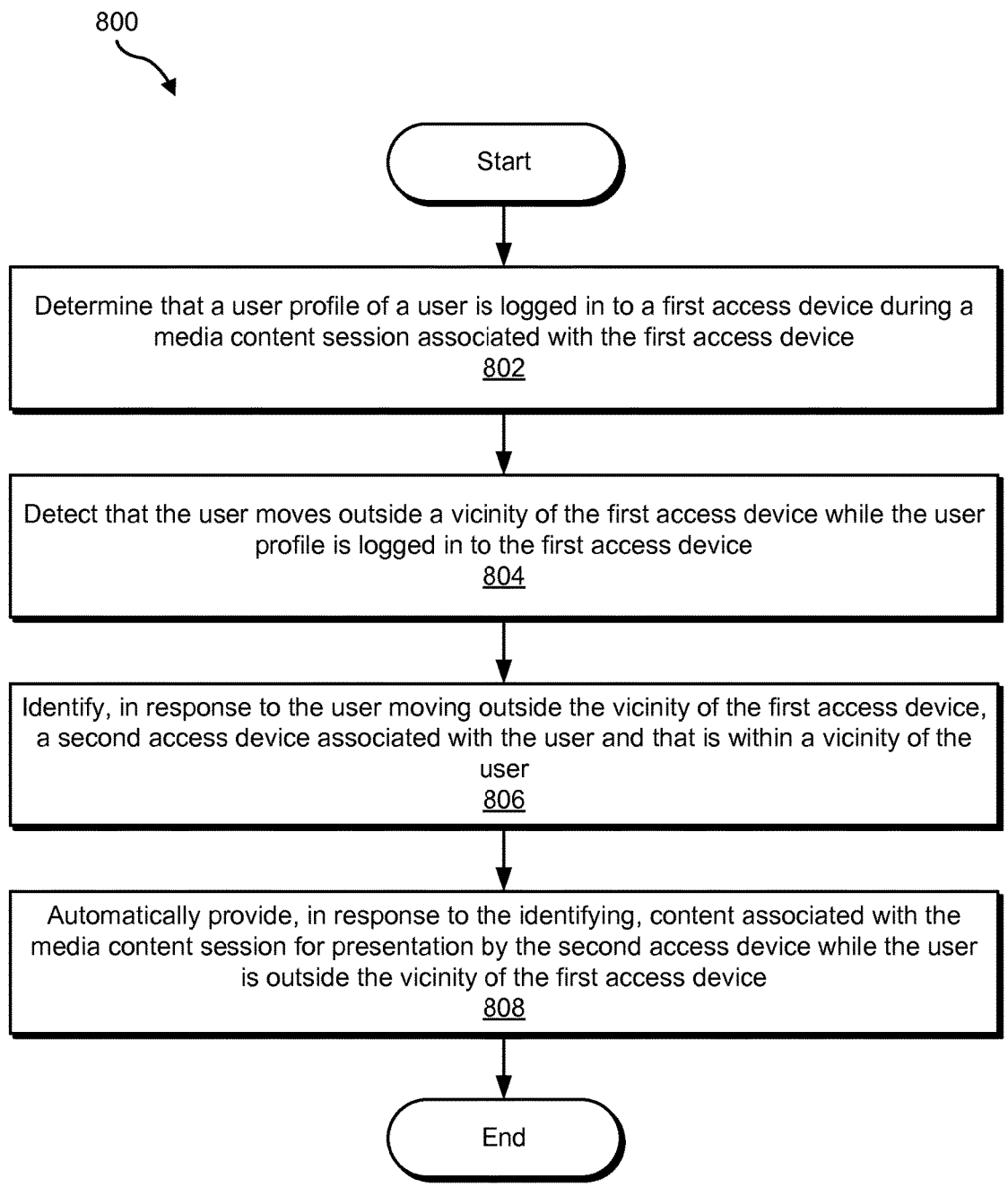
FIGS. 8-9 illustrate exemplary methods for facilitating access to content associated with a media content session according to principles described herein.
Figure 9:
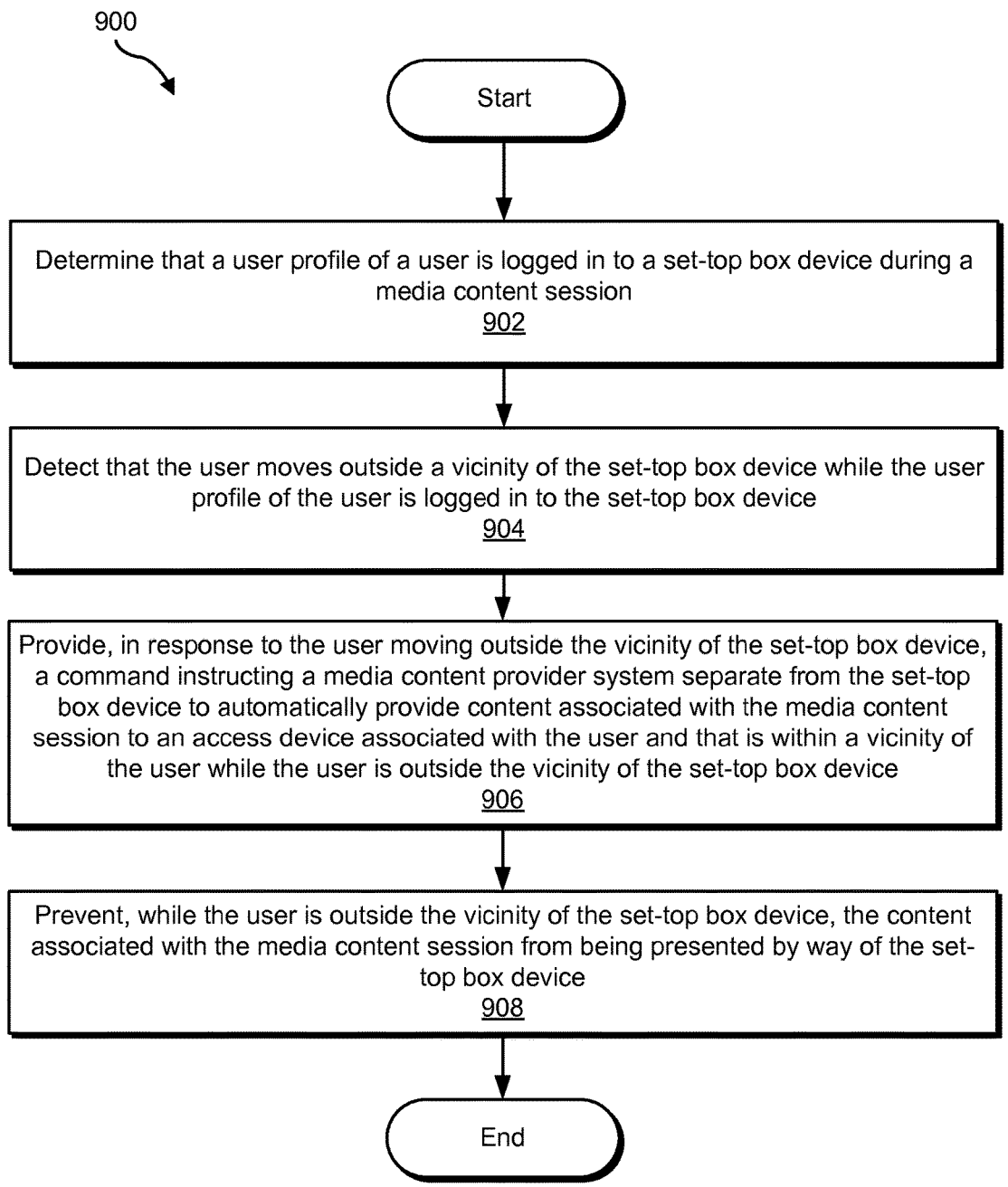

FIGS. 8-9 illustrate exemplary methods 800-900 for facilitating access to content associated with a media content session according to principles described herein. While FIGS. 8-9 illustrate exemplary steps according to certain embodiments, other embodiments may omit, add to, reorder, combine, and/or modify any of the steps shown in FIGS. 8-9. In certain embodiments, one or more of the steps shown in FIGS. 8-9 may be performed by system 100 and/or one or more components or implementations of system 100.

Turing to method 800 illustrated in FIG. 8, in step 802, a content delivery system determines that a user profile of a user is logged in to a first access device during a media content session associated with the first access device in which the first access device presents media content to the user. Step 802 may be performed in any of the ways described herein.

In step 804, the content delivery system detects that the user moves outside a vicinity of the first access device. As described above, the detection may occur while the user profile is logged in to the first access device during the media content session. Step 804 may be performed in any of the ways described herein.

In step 806, the content delivery system identifies, in response to the user moving outside the vicinity of the first access device, a second access device associated with the user and that is within a vicinity of the user. Step 806 may be performed in any of the ways described herein.

In step 808, the content delivery system automatically provides, in response to the identifying, content associated with the media content session for presentation by the second access device while the user is outside the vicinity of the first access device. For example, the content delivery system may automatically provide session management content corresponding to the media content session associated with the first access device. Additionally or alternatively, the content delivery system may automatically provide media content being presented by the first access device during the media content session for presentation by the second access device. Step 808 may be performed in any of the ways described herein.

Turning to the method 900 illustrated in FIG. 9, in step 902, a set-top box device determines that a user profile of a user is logged in to the set-top box device during a media content session in which the set-top box device presents media content to the user. Step 902 may be performed in any of the ways described herein.

In step 904, the set-top box device detects that the user moves outside a vicinity of the set-top box device. As discussed above, the set-top box may detect that the user moves outside the vicinity of the set-top box while the user profile of the user is logged in to the set-top box device during the media content session. Step 904 may be performed in any of the ways described herein.

In step 906, the set-top box device provides, in response to the user moving outside the vicinity of the set-top box device, a command instructing a media content provider system separate from the set-top box device to automatically provide content associated with the media content session to an access device associated with the user and that is within a vicinity of the user while the user is outside the vicinity of the set-top box device. Step 906 may be performed in any of the ways described herein.

In step 908, the set-top box device prevents, while the user is outside the vicinity of the set-top box device, the content associated with the media content session from being presented by way of the set-top box device. For example, the same content provided to an access device in step 906 may be prevented from being presented by the set-top box device. Step 908 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 10:
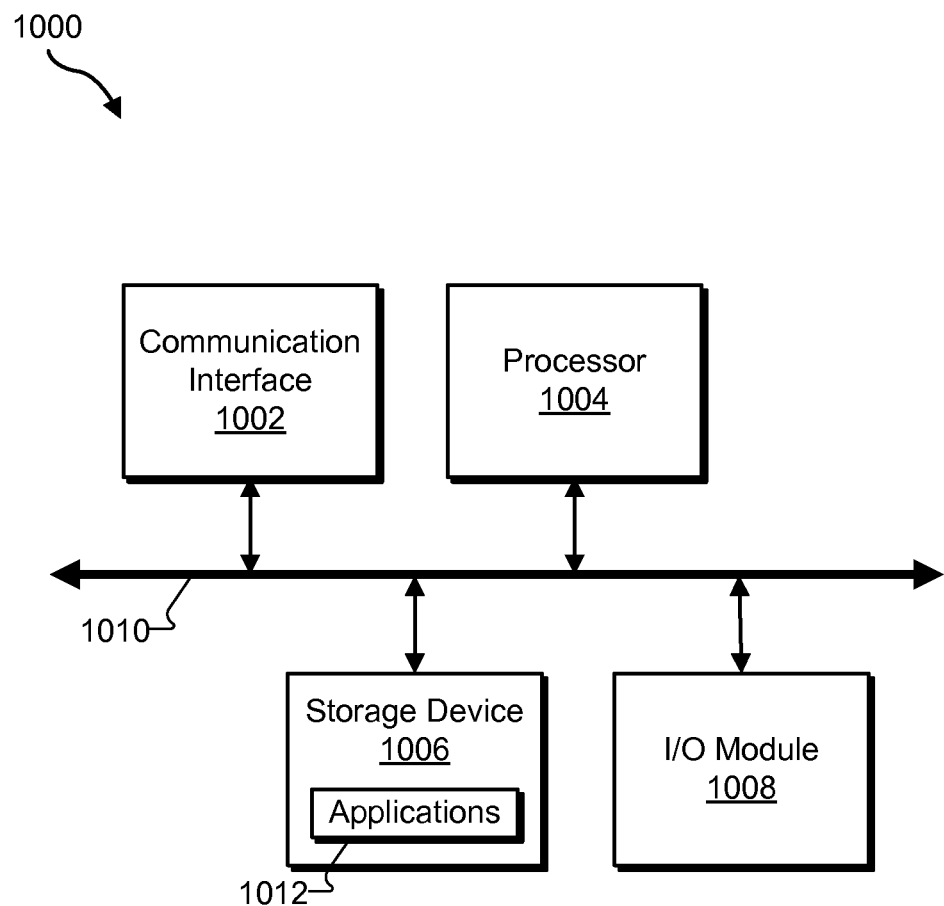
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output (I/O) module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. In at least one embodiment, communication interface 1002 may provide a direct connection between system 100 and one or more provisioning systems via a direct link to a network, such as the Internet. Communication interface 1002 may additionally or alternatively provide such a connection through, for example, a local area network (such as an Ethernet network), a personal area network, a telephone or cable network, a satellite data connection, a dedicated URL, or any other suitable connection. Communication interface 1002 may be configured to interface with any suitable communication media, protocols, and formats, including any of those mentioned above.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory (RAM), dynamic RAM (DRAM), other non-volatile and/or volatile data storage units, or a combination or sub-combination hereof. Electronic data, including data described herein, may be temporarily and/or permanently stored in storage device 1006. For example, data representative of one or more executable applications 1012 (which may include, but are not limited to, one or more of the software applications described herein) configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1000. For example, one or more applications 1012 residing within storage device 1006 may be configured to direct processor 1004 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    determining, by a content delivery system, that a user profile of a user is logged in to a first access device during a media content session associated with the first access device in which the first access device presents media content to the user, the first access device provided at a location at a user premises;
    detecting, by the content delivery system, that the user moves outside a vicinity of the first access device while the user profile is logged in to the first access device during the media content session;
    identifying, by the content delivery system in response to the user moving outside the vicinity of the first access device, a second access device associated with the user and that is within a vicinity of the user;
    detecting, by the content delivery system and while the user is outside the vicinity of the first access device, an occurrence of an event that occurs while the media content is presented by the first access device during the media content session, the event represented by a video highlight of a sporting event;
    automatically providing, by the content delivery system in response to the identifying of the second access device and the detecting of the occurrence of the event, session management content corresponding to the media content session associated with the first access device for presentation by the second access device while the user is outside the vicinity of the first access device, the session management content comprising a notification that includes information regarding the event and an option for the user to experience the video highlight of the sporting event; and
    preventing, by the content delivery system while the user profile of the user is logged in to the first access device and the user is outside the vicinity of the first access device and while the media content is presented by the first access device at the location at the user premises, the notification including the option for the user to experience the video highlight of the sporting event from being presented by way of the first access device to an additional user that is within the vicinity of the first access device and that is presented with the media content by way of the first access device while the user profile of the user is logged in to the first access device.

2. The method of claim 1, wherein the detecting that the user moves outside the vicinity of the first access device comprises detecting that a wireless tracking device carried by the user moves outside a wireless range of the first access device.

3. The method of claim 2, wherein the wireless range comprises at least one of a Bluetooth communication range and a near field communication range.

4. The method of claim 1, wherein the location at the user premises is a first room at the user premises, and the first access device includes a set-top box device located in the first room at the user premises.

5. The method of claim 4, wherein the second access device is located in a second room at the user premises.

6. The method of claim 4, wherein the second access device includes a mobile device associated with the user.

7. The method of claim 1, further comprising automatically logging in the user profile of the user to the second access device, by the content delivery system, in response to the user moving outside the vicinity of the first access device and the identifying of the second access device associated with the user and that is within the vicinity of the user.

8. The method of claim 1, further comprising automatically logging the user profile out of the first access device, by the content delivery system, in response to the user moving outside the vicinity of the first access device.

9. The method of claim 8, further comprising:
    detecting, by the content delivery system, that the additional user is within the vicinity of the first access device subsequent to the user moving outside the vicinity of the first access device; and
    automatically logging, by the content delivery system in response to the detecting that the additional user is within the vicinity of the first access device, a user profile of the additional user in to the first access device after the user profile of the user is logged out of the first access device.

10. The method of claim 1, further comprising automatically providing, by the content delivery system in response to the identifying, a media content program being presented by the first access device during the media content session while the user is outside the vicinity of the first access device for presentation by the second access device while the user is outside the vicinity of the first access device.

11. The method of claim 1, wherein the session management content corresponding to the media content session further includes at least one of one or more selectable options associated with the media content session and a recommendation associated with the media content session.

12. The method of claim 1, further comprising providing, by the content delivery system based on the detecting of the event, an additional option for the user to experience the media content by way of the second access device while the user is outside the vicinity of the first access device.

13. The method of claim 12, further comprising:
    detecting, by the content delivery system, a selection by the user of the additional option; and
    directing, by the content delivery system in response to the selection by the user of the additional option, the second access device to begin presenting the media content.

14. The method of claim 1, embodied as computer-executable instructions on at least one non-transitory computer-readable medium.

15. A method comprising:
    determining, by a set-top box device, that a user profile of a user is logged in to the set-top box device during a media content session associated with the set-top box device in which the set-top box device presents media content to the user, the set-top box device provided at a location at a user premises;

detecting, by the set-top box device, that the user moves outside a vicinity of the set-top box device while the user profile of the user is logged in to the set-top box device during the media content session;

detecting, by the set-top box device while the user is outside the vicinity of the set-top box device, an occurrence of an event that occurs while the media content is presented by the set-top box device during the media content session, the event represented by a video highlight of a sporting event;

providing, by the set-top box device in response to the user moving outside the vicinity of the set-top box device and the detecting of the occurrence of the event, a command instructing a media content provider system separate from the set-top box device to automatically provide session management content corresponding to the media content session associated with the set-top box device to an access device associated with the user and that is within a vicinity of the user while the user is outside the vicinity of the set-top box device, the session management content comprising a notification that includes information regarding the event and an option for the user to experience the video highlight of the sporting event; and preventing, by the set-top box device while the user profile of the user is logged in to the set-top box device and the user is outside the vicinity of the set-top box device and while the media content is presented by the set-top box device provided at the location at the user premises, the notification including the option for the user to experience the video highlight of the sporting event from being presented by way of the set-top box device to an additional user that is within the vicinity of the set-top box device and that is presented with the media content by way of the set-top box device while the user profile of the user is logged in to the set-top box device.

16. The method of claim 15, further comprising:

detecting, by the set-top box device while the user is outside the vicinity of the set-top box device, that the additional user is within the vicinity of the set-top box device; and automatically logging in, by the set-top box device in response to the detecting that the additional user is within the vicinity of the set-top box device, a user profile of the additional user to the set-top box device.

17. The method of claim 15, embodied as computer-executable instructions on at least one non-transitory computer-readable medium.

18. A system comprising:

at least one computing device that determines that a user profile of a user is logged in to a first access device during a media content session associated with the first access device in which the first access device presents media content to the user, the first access device provided at a location at a user premises, detects that the user moves outside a vicinity of the first access device while the user profile is logged in to the first access device during the media content session, identifies, in response to the user moving outside the vicinity of the first access device, a second access device associated with the user and that is within a vicinity of the user, detects, while the user is outside the vicinity of the first access device, an occurrence of an event that occurs while the media content is presented by the first access device during the media content session, the event represented by a video highlight of a sporting event, automatically provides, in response to the identifying of the second access device and the detecting of the occurrence of the event, session management content corresponding to the media content session associated with the first access device for presentation by the second access device while the user is outside the vicinity of the first access device, the session management content comprising a notification that includes information regarding the event and an option for the user to experience the video highlight of the sporting event, and prevents, while the user profile of the user is logged in to the first access device and the user is outside the vicinity of the first access device and while the media content is presented by the first access device at the location at the user premises, the notification including the option for the user to experience the video highlight of the sporting event from being presented by the first access device to an additional user that is within the vicinity of the first access device and that is presented with the media content by way of the first access device while the user profile of the user is logged in to the first access device.

19. The method of claim 1, further comprising:

detecting, by the content delivery system, a selection of the option by the user; and directing, by the content delivery system in response to the detecting of the selection of the option by the user, the second access device to begin presenting the video highlight of the sporting event.

* * * * *